United States Patent Office 3,346,664
Patented Oct. 10, 1967

3,346,664
COATING COMPOSITIONS CONTAINING HYDROXYLATED DIOLEFIN POLYMER AND SILICONE RESIN
Stephen A. Yuhas, Jr., Perth Amboy, and Clifford W. Muessig, Roselle, N.J., and Marnell Albin Segura, Baton Rouge, La., assignors to Esso Research and Engineering Company, a corporation of Delaware
No Drawing. Filed Nov. 3, 1964, Ser. No. 408,681
6 Claims. (Cl. 260—827)

ABSTRACT OF THE DISCLOSURE

A coating composition comprises a liquid hydroxylated diolefin polymer containing 5 to 20 wt. percent of a polysiloxane having the following structure:

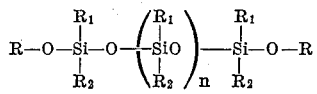

where R is a $C_1$ to $C_4$ alkyl and $R_1$ and $R_2$ are selected from the group consisting of $C_1$ to $C_4$ alkyl, $C_1$ to $C_4$ alkoxyl and $C_6$ to $C_8$ aryl, alkylaryl aralkyl and $n$ is an integer of from 1 to 4.

---

This invention relates to an improvement in the drying properties of certain modified liquid diolefin polymers and more particularly relates to improving the hardness of baked films of such modified polymers and to the coating compositions themselves.

It is well known that durable varnish and enamel films can be prepared from the synthetic drying oils obtained by the polymerization of conjugated diolefins of 4 to 6 carbon atoms with or without other monomers, such as styrene, in the presence of a variety of alkali-metal or Lewis acid catalysts. Films suitable for many applications can easily be prepared from these oils by air-drying or baking. However, films prepared from these liquid polymers exhibit poor pigment-wetting properties and poor hardness. These disadvantages can be overcome by modifying the liquid hydrocarbon oils so as to introduce polar groups, e.g. oxygen functionality into the polymer molecule. One method by which this is accomplished is by reacting the liquid diolefinic polymer with carbon monoxide and hydrogen in the presence of a hydroformylation catalyst under conditions in which a substantially completely saturated hydroxylated polymer is produced. Unfortunately, however, films prepared from these modified polymers lack sufficient hardness to be useful under certain circumstances. Since increased hardness usually results in increased durability, abrasion resistance, solvent resistance, etc., this becomes very important.

In accordance with the present invention it has been discovered that the addition of 5 to 20 weight percent of a polysiloxane having at least two alkoxy groups to the hydroxylated polymer will result in a product which will give films of increased hardness.

The polymers to be hydroxylated are obtained by copolymerizing 60 to 100 parts of butadiene-1,3 with 40 to 0 parts of styrene, preferably about 75 to 85 parts of the former and 25 to 15 parts of the latter, the polymerization being carried out at 20 to 100° C., preferably below the melting point of the catalyst or between 65 to 85° C., in a reaction diluent. Temperatures near the lower end of the range set forth are generally more suitable for batch polymerizations and temperatures near the upper end of the range are particularly suited for continuous operation. A variety of catalysts may be used such as sodium dispersions, sodium naphthalene, butyl lithium in selected solvents and Lewis acids such as boron fluoride-etherate. As a specific embodiment, a polymerization catalyst consisting of 0.1 to 10 parts, preferably about 1 to 3 parts of a finely dispersed metallic sodium catalyst is used in the optional presence of various polymerization modifiers which tend to promote the reaction and produce colorless products of more exactly reproducible drying rates. As reaction diluent it is desirable to use, for example, a naphtha having a boiling range between about 90 to 120° C. or straight-run mineral spirits such as Varsol (boiling range 150 to 200° C.), inert hydrocarbon diluents such as butane, xylene, benzene, toluene, cyclohexane or the like, individually or in admixture with each other. To be suitable for the polymerization reaction here involved, the diluents should have a boiling range within the limits of about $-15°$ C. and 200° C. The diluents are usually used in amounts ranging from 50 to 500, preferably 200 to 300 parts per 100 parts of monomers.

Instead of using inert diluents, it is also possible to use modifying diluents such as butene-2, or other low boiling olefins which modify the reaction by limited copolymerization and chain termination. Various ethers having more than two carbon atoms per molecule such as diethyl ether, diisopropyl ether, dioxane, vinyl ethyl ether, vinyl isopropyl, vinylisobutyl ether, anisole, phenetole and other ethers of various types are also useful as diluents and are particularly helpful as co-diluents to insure formation of colorless products when used in amounts ranging from about 10 to 35 parts per 100 parts of monomers, together with the aforesaid amount of inert diluent such as solvent naphtha, p-dioxane, m-dioxane, and their various methyl and ethyl homologues are particularly preferred. In selecting the ether co-diluent it is especially desirable to select an ether having a boiling point at least 10° C. below the lower limit of the boiling range of the hydrocarbon diluent and thus, when using Varsol, ether co-diluents boiling between about 25 and 140° C. are preferred in order to permit its ready recovery from the polymerized reaction mixture.

Other means of modifying the properties of the polymer product involve the substitution of all or at least part of the butadiene feed wtih other diolefins such as isoprene, 2,3-dimethyl butadiene-1,3, piperylene or 2-methyl pentadiene-1,3. Likewise, styrene may be replaced by its various ring-alkylated homologues such as the various methyl styrenes, dimethyl styrenes, ethyl styrenes or diethyl styrenes. In particular it is desirable to add the styrene monomer to the reaction mixture only after the polymerization of the butadiene has been initiated. By this expedient, the induction period is quite substantially reduced, and the polymer produced is gel-free and of desirably low viscosity as opposed to a more viscous product obtained when the styrene monomer is present in the reaction mixture from the beginning.

Especially where a coarse dispersion of sodium is used as catalyst, it is also advantageous to use about 1 to 50%, preferably 10 to 20% based on sodium of a $C_1$ to $C_5$ aliphatic alcohol. Secondary and tertiary alcohols, particularly isopropanol or tertiary butanol are preferred. Such alcohols act as polymerization promoters, and, depending on the degree of catalyst dispersion, have a more or less pronounced effect on the intrinsic viscosity of the resulting product. The reaction time and induction period also vary depending on the degree of catalyst dispersion and reaction temperature, the reaction time ranging from about forty hours with a coarse catalyst at about 50° C. to about fifteen minutes at about 100° C. with a catalyst particle size of less than 100 microns diameter. While sodium is preferred, similar catalysts such as potassium, sodium hydride, lithium alkyls, sodium aryls, and various alloys of sodium are also useful. Agitation of the reaction mixture during synthesis increases the efficiency of the catalyst. Conversions of 50 to 100% on monomers can be accomplished fairly readily in batch-type as well as in continuous polymerizations, although the catalyst requirements are twice or three times greater for continuous operation than for a batch operation and equal conversion.

Destruction of catalyst at the end of the reaction is effectively accomplished by adding to the reactor a moderate excess of alcohol, e.g. 100% excess of isopropanol based on sodium, and agitating at the reaction temperature for another half hour or so. After destruction of the residual sodium by alcohol the crude product containing the alcoholate, excess alcohol and other solid impurities is cooled, neutralized with dry carbon dioxide, glacial acetic acid or other preferably anhydrous acid which does not affect the polymer, and the neutralized product is then filtered with a filter aid such as silica gel, clay, charcoal or its equivalent.

In the preferred modification the clear colorless filtrate is then fractionally distilled to remove first the alcohol-hydrocarbon azeotropes and then the dioxane-hydrocarbon azeotropes. Finally, if the polymerization is carried out in a relatively large amount of hydrocarbon diluent so that the resulting polymer solution is to dilute for use as a varnish or enamel base, it is desirable to distill off additional hydrocarbon until a product containing the desired non-volatile matter is obtained, e.g. 50–90% NVM, the non-volatile matter being the polymeric drying oil. The resulting product, being a solution of polymeric drying oil in a suitable hydrocarbon solvent such as solvent naphtha or mineral spirits, is a clear, colorless varnish composition having a viscosity between about 0.5 to 5 poises at 50% non-volatile matter.

A substantially completely saturated hydroxylated polymer can be produced from the above polymers by utilizing a two-stage process in which process conditions in the first stage are set to maximize oxonation and minimize hydrogenation of unsaturated carbon-carbon linkages, followed by a second stage opearting under maximum hydrogenation conditions. Hence, in accordance with such process, the hydroxylated polymers are produced in a two-stage process which comprises reacting, in a first stage, a polymer as above described with carbon monoxide and hydrogen in the presence of a hydrocarbon soluble complex having the formulae:

(1) $\qquad [M_2(CO)_6(BR_3)_2]$ and (2) $\qquad [(R')M(CO)_y(BR_3)]_x$ where in both Formula 1 and Formula 2 M is a transition metal selected from the group consisting of iron, cobalt, and rhodium, and preferably is cobalt; B is a Group VA atom selected from the group consisting of phosphorus and arsenic, and preferably is phosphorus; R is an alkyl radical containing from 1 to about 20, and preferably 1 to 6 carbon atoms and in Formula 2 R' represents a pi-bonded conjugated diolefin or allylic structure containing 3 to 6 carbon atoms; x is 1 or 2 and y is 1 or 2, with the proviso that when x is 1 then y is 2, and when x is 2, then y is 1, to produce a carbonylated intermediate polymer and, in a second stage, reacting said intermediate polymer with hydrogen and from 10 to 200 p.s.i.g. partial pressure of CO in the presence of a catalyst as set forth above and recovering the resulting hydroxylated polymer.

The preferred forms of the complexes employed in both stages of the process, however, are presented by Formulae 3 and 4, which are as follows:

(3) $\qquad [Co_2(CO)_6(PR_3)_2]$ and (4) $\qquad [(C_nH_{2n-1})Co(CO)_y(PR_3)]_x$ where in both Formula 3 and Formula 4, R is an alkyl radical containing from 1 to 6 carbon atoms, and in Formula 4, n is an integer from 3 to 6, and x and y are as defined above.

With regard to the complexes employed in both stages of the process, it should be noted that some of the catalytic species may be isolated in a stable crystalline form which has unique and unusual properties. Further, all of these active catalyst species are extremely soluble in both hydrocarbon and polar solvents and in the latter solvents exhibit the conductivity of a typical weak electrolyte. However, the infrared spectrum of each of the catalysts is the same in all solvents in which it has been measured, thereby indicating no reaction with the solvent.

Preparation of the complexes employed in both stages of the process is described more fully in co-pending applications, Ser. No. 256,258, now U.S. Patent No. 3,310-576 and Ser. No. 256,260, now abandoned, of Mertzweiller and Tenney, both filed Feb. 5, 1963. It should be understood, however, that the scope of the instant application should be in no way restricted in view of the above disclosures.

In broad terms, the first stage hydroformylation reaction step of the process to which the present invention is concerned is effected by intimately contacting an olefinic hydrocarbon polymer with carbon monoxide and hydrogen in the presence of the phosphine catalyst complex hereinbefore described at hydroformylation temperature and pressure. The particular conditions selected to be employed will be dependent on the reaction product desired. For example, a wide variety of hydroformylated products may be produced by the practice of the present invention characterized by at least three variables, viz. (1) hydroxyl group content, (2) carbonyl (aldehyde) group content, and (3) residual unsaturation content. Thus, control of the type of functionality and unsaturation may be achieved by the specific catalyst and reaction condition employed, i.e. temperature, $H_2$ and CO partial pressure, etc. In this first stage, conditions are set to maximize carbonylation and minimize hydrogenation.

The first stage reaction may be performed at pressures of from 300 to 2000 p.s.i.g., and preferably at pressures of from 500 to 1200 p.s.i.g.

The first stage reaction temperatures employed are in the range of from 275 to 425° F., and are preferably in the range of from 300 to 400° F.

The reaction time in the first stage is from thirty minutes to five hours and preferably is from one to three hours.

The molar ratio of hydrogen to carbon monoxide is not especially critical and may be varied to some extent. Suitably, the ratio employed will be about 1:1. It has been found, however, that by increasing the $H_2/CO$ ratio to about 3:1, the rate of reaction, as well as the yield of carbonylated product may be increased. While ratios higher than the foregoing, for example, 10:1 or higher, may be employed, there is no advantage in using said higher ratios.

The use of low catalyst concentrations, that is, 0.05 to 0.5 weight percent as metal based on the weight of the polymer, is preferred in the process of the present invention. The most suitable range includes catalyst concentrations as low as 0.1 to 0.40 wt. percent as metal based on the weight of the polymer.

Use of the first stage reaction temperature set forth above, e.g. 300 to 400° F., using 1/1 ratio of $H_2/CO$ gas at 500 to 1200 p.s.i.g. total pressure results in a predominance of aldehydic products. At these conditions, the hydroformylation is quite selective, there is little competing hydrogenation, and the residual unsaturation depends primarily upon the amount of functionality introduced. The second stage hydrogenation reaction may be performed at pressures of from 100 to 3000 p.s.i.g., and preferably at pressures of from 1000 to 1500 p.s.i.g.

The second stage reaction temperatures employed are in the range of from 325 to 450° F., and are preferably in the range of from 375 to 425° F.

The reaction time in the second stage is from 0.5 to six hours, and preferably is from one to two hours.

Hydrogenation of the intermediate aldehydic product of stage 1 is preferably effected with the same catalyst used in the first stage although additional catalyst may be added, if desired.

In the second stage, an extremely rapid hydrogenation is achieved which will hydrogenate not only the carbonyl group, but also internal unsaturation in the polymer chain. This is believed to proceed with a homogeneous catalyst system which activates hydrogen, the primary component of which being the complexes as hereinbefore described, and very probably previously undisclosed metal hydrocarbonyls containing phosphorus ligands, e.g.

and
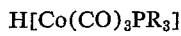
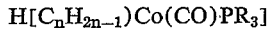

which are now found to be unusually stable and active hydrogenation catalysts. It is, therefore, preferable to avoid conversion of the complexes to metallic forms of cobalt, even in colloidal forms. This object is accomplished by retaining sufficient CO partial pressure, for example, about 10 to 500 p.s.i.g., and preferably about 30 to 90 p.s.i.g., to stabilize the system.

The prevention of formation of metallic forms, especially the colloidal form, from the catalyst complexes is noteworthy inasmuch as such formation is not only deleterious to the effectiveness of the hydrogenation reaction per se, but such colloidal form also makes removal of the catalyst metal most difficult, if not impossible. Thus, proper hydrogenation procedure is imperative to insure the success of the present invention.

Preparation of the hydroxylated polymers which are subjected to treatment in accordance with the present invention is described more fully in co-pending application, Ser. No. 307,359 of Cull, Mertzweiller, and Tenney, filed Sept. 9, 1963. It should again be understood that the scope of the instant application should be in no way restricted in view of the above disclosure.

Polysiloxanes useful in this invention may be shown graphically as below:

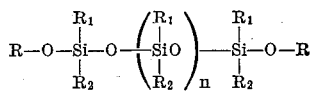

where R is a $C_1$ to $C_4$ alkyl and $R_1$ and $R_2$ are selected from the group consisting of $C_1$ to $C_4$ alkyl, $C_1$ to $C_4$ alkoxyl and $C_6$ to $C_8$ aryl, alkylaryl and aralkyl and $n$ is an integer of from 1 to 4. One method for preparing these polysiloxanes involves reacting a silane or mixture of silanes responding to the general formula $R_nSiCl_{4-n}$ with an alcohol in amount such that the ratio of alkoxy groups to silicon in the reaction product is at least 1. The resulting alkoxylated chlorosilane is then hydrolyzed by adding thereto water in amount sufficient to remove all of the chlorine atoms, or mixed with the same, or other alkyl or aryl chlorosilane before hydrolysis in the ratio of 2 alkoxylated silanes to 1 to 4 other silanes. Under such conditions only a very few of the alkoxy groups will be hydrolyzed, and the resulting siloxane will contain alkoxy groups in amount approximately equivalent to the alcohol added. During the alcoholysis and hydrolysis steps the temperature is maintained between 30° C. and 35° C. After addition of the water, any volatile materials which may be present are removed by distillation.

Any alkoxy radical, such as for example, methoxy, ethoxy and butoxy, may be employed in the process of this invention, but in any case it is preferred that the polysiloxane have a minimum of 2 alkoxyl groups.

The resulting alkoxylated polysiloxanes are mobile liquids. For the purposes of this invention the R groups on the siloxane may be saturated aliphatic radicals containing less than seven carbon atoms, such as methyl, ethyl, propyl, butyl, cyclohexyl, and cyclopentyl radicals, or monocyclic aryl radicals such as phenyl, chlorophenyl, tolyl, and xylyl. Specific examples of polysiloxanes which are suitable for use in this invention include trimethyl triphenyl dimethoxy trisiloxane, dimethyl triphenyl trimethoxy trisiloxane, trimethyl triphenyl dibutoxy trisiloxane and the like.

The following examples are illustrative only and are not to be construed as limiting the invention which is properly delineated in the appended claims.

Example 1

A polymeric oil was provided from the compounds indicated herebelow:

| | Parts |
|---|---|
| Butadiene-1,3 | 100 |
| Varsol [1] | 200 |
| Dioxane | 40 |
| Isopropanol | 0.2 |
| Sodium [2] | 1.5 |

[1] Straight-run mineral spirits; API gravity, 49.1; flash, 105° F.; boiling range, 150° to 200° C.; solvent power 33–37 Kauri-Butanol value (reference scale: Benzene–100 K.B. value, n-heptane 25.4 K.B. value).
[2] Dispersed to a particle size of 10 to 50 microns by means of an Eppenbach homo-mixer.

The polymerization was performed at 50° C. in a 2-liter autoclave equipped with a mechanical agitator. Complete conversion was obtained in 4.5 hours. The catalyst was destroyed and removed from the resulting crude product. The resulting polymer had a molecular weight of about 2000 and approximately 70% of its unsaturation was Type I and 30% was Type II.

Example 2

Seven hundred grams of polybutadiene having a molecular weight of 2000 in benzene (40% NVM) were hydroformylated in two stages using tributyl phosphine modified cobalt octacarbonyl (0.09% cobalt on feed) under the following conditions:

| Process Conditions | Oxo Stage | Hydrogenation Stage |
|---|---|---|
| Temp., ° F | 350–360 | 390–400 |
| Press., p.s.i.g | 1,000–1,100 | 1,400–1,500 |
| Gas | Syn. Gas | Hydrogen |
| ΔP, p.s.i.g | 1,100 | 1,900 |

At the conclusion of the hydrogenation step, 0.75 wt. percent of water was added and the product stirred for twenty minutes at 395° F.

The resulting hydroxylated polymer product after filtering gave the following analyses:

Oxygen (solvent-free basis) _____percent__ 7.8
NVM _____ 40.5
Cobalt (polymer basis) _____p.p.m__ 416

Example 3

The polymer of Example 1 was hydroxylated under similar conditions to those shown in Example 2 to yield a product having the following analysis (solvent-free basis):

Oxygen=8.2 wt. percent
Hydroxyl No.=236 mgm. KOH/gm.

Example 4

The polymer of Example 1 was hydroxylated under similar conditions to those shown in Example 2 to yield a product having the following analysis (solvent-free basis):

Oxygen=7.6 wt. percent
Hydroxyl No.=234 mgm. KOH/gm.

Example 5

The polymer of Example 1 was hydroxylated under similar conditions to those shown in Example 2 to yield a product having the following analysis (solvent-free basis):

Oxygen=8.1 wt. percent
Hydroxyl No.=235 mgm. KOH/gm.

Example 6

The hydroxylated polymers of Examples 3, 4, and 5 were mixed with varying amounts of dimethyltriphenyl-trimethoxytrisiloxane and films were laid down on Q-plate (.032″ cold-rolled steel) and baked for thirty minutes at 350° F. The following data were obtained:

| Resin Formulation | Cure | Mils Thick | Pencil Hardness [1] | Direct Impact [2] | Remarks |
|---|---|---|---|---|---|
| Hydroxylated Polymer of Example 3 | 30′—350° F | .3 | H, 2H | 160 | Few eyeholes. |
|  |  | .9 | F, H | 160 | Do. |
| +5% Dow Corning Sylkyd 50 [3] | 30′—350° F | .5 | 4H, 5H | 160 | No eyeholes. |
|  |  | .9 | 5H, 6H | 160 | Do. |
| +10% Dow Corning Sylkyd 50 [3] | 30′—350° F | .4 | 6H, 7H | 160 | No eyeholes. |
|  |  | .9 | 4H, 5H | 160 | Do. |
| +20% Dow Corning Sylkyd 50 [3] | 30′—350° F | .4 | 6H, 7H | 160 | No eyeholes. |
|  |  | .8 | 5H, 6H | 160 | Do. |
| Hydroxylated Polymer of Example 4 | 30′—350° F | .3 | 3H, 4H | 160 | Few eyeholes. |
|  |  | .7 | F, H | 140 | Do. |
| +5% Sylkyd 50 [3] | 30′—350° F | .4 | >7H | 160 | No eyeholes. |
|  |  | .9 | 5H, 6H | 160 | Do. |
|  |  | .5 | 6H, 7H | 160 | Do. |
| +10% Sylkyd 50 [3] | 30′—350° F | .9 | 5H, 6H | 160 | No eyeholes. |
| +20% Sylkyd 50 [3] | 30′—350°F | .4 | >7H | 160 | No eyeholes. |
|  |  | .8 | 6H, 7H | 160 | Do. |
| Hydroxylated Polymer of Example 5 | 30′—350° F | .3 | 2H, 3H | 160 | Few eyeholes. |
|  |  | .7 | F, H | 160 | Do. |
| +5% Sylkyd 50 [3] | 30′—350° F | .7 | 6H, 7H | 160 | No eyeholes. |
| +10% Sylkyd 50 [3] | 30′—350° F | .5 | 6H, 7H | 160 | Do. |
| +20% Sylkyd 50 [3] | 30′—350° F | .5 | 5H, 6H | 160 | Do. |

[1] Hardness Pencil: Softest that will scratch; 6B softest, 7H hardest; 6B, 5B, . . . B, HB, F, H, 2H, . . . 7H.
[2] Max. impact in in. pounds that coating will withstand without visible failure (⅝″ dia.).
[3] Dimethyl triphenyltrimethoxy trisiloxane.

The above data show that the addition of 5 to 20 wt. percent of a polysiloxane to a hydroxylated diolefin polymer increases the hardness of baked films of such polymer.

Example 7

Seven hundred grams of polybutadiene in toluene diluent (40% NVM) plus a preformed hydrocarbon soluble catalyst prepared from 30 grams of cobalt octacarbonyl (2.8% Co) in hexane and 3.0 grams of triethylphosphine were charged to a 2-liter stirred autoclave. The polymer was hydroformylated under the following conditions:

Temperature _____° F__ 320–330
Synthesis gas press. _____p.s.i.g__ 1000–1100
CO/H$_2$ ratio _____ 1/1.25
ΔP (syn. gas) _____lbs__ 1300
Time _____hrs__ 3.0

The solvent-free product was found to contain 8 wt. percent oxygen, principally aldehydic by I.R., NVM of hydroformylated polymer, 40.6 wt. percent, Co=76 p.p.m. (polymer basis).

Films of this polymer were laid down on Q-plate (0.32″ cold rolled steel) and cured for thirty minutes at 350° F. The following data were obtained:

| | Mils | Hard P | Impact | | Flex. ⅛″ M |
|---|---|---|---|---|---|
| | | | D | R | |
| Carbonylated Polymer | 0.6 | 5H | 35 | 35 | Pass. |
|  | 0.9 | 2H | 25 | 25 | Fail. |
|  | 1.1 | H | 25 | 20 | Do. |
| Carbonylated Polymer plus 10% Sylkyd 50. | 0.6 | 5H | 45 | 40 | Pass. |
|  | 0.9 | 2H | 40 | 40 | Fail. |
|  | 1.1 | H | 25 | 20 | Do. |

The above data show that no improvement is obtained when the siloxane is added to a carbonylated polymer in contrast to a hydroxylated polymer.

The advantages of the present invention having been thus fully set forth and specific examples of the same given, what is claimed as new and useful and desired to be secured by Letters Patent is:

1. A new coating composition comprising a liquid hydroxylated diolefin polymer containing 5 to 20 wt. percent of a polysiloxane having the formula

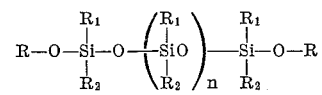

where R is a $C_1$ to $C_4$ alkyl and $R_1$ and $R_2$ are selected from the group consisting of $C_1$ to $C_4$ alkyl, $C_1$ to $C_4$ alkoxyl and $C_6$ to $C_8$ aryl, alkylaryl and aralkyl and $n$ is an integer of from 1 to 4.

2. A coating composition comprising a liquid hydroxylated polybutadiene containing 5 to 20 wt. percent of a polysiloxane having the formula

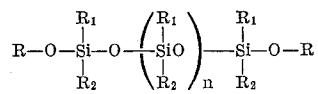

where R is a $C_1$ to $C_4$ alkyl and $R_1$ and $R_2$ are selected from the group consisting of $C_1$ to $C_4$ alkyl, $C_1$ to $C_4$ alkoxyl and $C_6$ to $C_8$ aryl, alkylaryl and aralkyl and $n$ is an integer of from 1 to 4.

3. The coating composition of claim 2 in which the polysiloxane is dimethyl triphenyltrimethoxy trisiloxane.

4. A structure comprising a metal surface coated with a baked film of the composition of claim 1.

5. A structure comprising a metal surface coated with a baked film of the composition of claim 2.

6. A structure comprising a metal surface coated with a baked film of the composition of claim 3.

References Cited

UNITED STATES PATENTS 3,311,598  3/1967  Mertzweiller et al. ___ 260—85.1

SAMUEL H. BLECH, *Primary Examiner.*